(12) United States Patent
Duan et al.

(10) Patent No.: US 11,148,044 B2
(45) Date of Patent: *Oct. 19, 2021

(54) INPUT DEVICE FOR INTELLIGENT TERMINAL

(71) Applicant: SHANGHAI ZHONGLIAN TECHNOLOGIES LTD., CO, Shanghai (CN)

(72) Inventors: Haitao Duan, Shanghai (CN); Zhicheng Ding, Shanghai (CN); Peng Li, Shanghai (CN)

(73) Assignee: SHANGHAI ZHONGLIAN TECHNOLOGIES LTD., CO, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/765,521

(22) PCT Filed: Oct. 24, 2018

(86) PCT No.: PCT/CN2018/111752
§ 371 (c)(1),
(2) Date: May 20, 2020

(87) PCT Pub. No.: WO2019/100895
PCT Pub. Date: May 31, 2019

(65) Prior Publication Data
US 2020/0316460 A1    Oct. 8, 2020

(30) Foreign Application Priority Data
Nov. 24, 2017 (CN) .......................... 201721592060.2

(51) Int. Cl.
*A63F 13/24* (2014.01)
*G06F 3/0362* (2013.01)
(Continued)

(52) U.S. Cl.
CPC ................ *A63F 13/24* (2014.09); *G06F 3/02* (2013.01); *G06F 3/0338* (2013.01);
(Continued)

(58) Field of Classification Search
CPC .... A63F 13/2145; A63F 13/235; A63F 13/24; A63F 2300/1031; A63F 2300/1043;
(Continued)

(56) References Cited

U.S. PATENT DOCUMENTS 9,005,026 B2 * 4/2015 Joynes .................... A63F 13/24
463/37
2013/0040737 A1 * 2/2013 Raghoebardajal ...... A63F 13/65
463/37
(Continued)

FOREIGN PATENT DOCUMENTS

CN    201965558 U    9/2011
CN    102369717 A    3/2012
(Continued)

OTHER PUBLICATIONS

International Patent Application No. PCT/CN2018/111752; Int'l Search Report; dated Jan. 23, 2019; 2 pages.

*Primary Examiner* — Afroza Chowdhury
(74) *Attorney, Agent, or Firm* — BakerHostetler

(57) ABSTRACT

The present disclosure provides an input device for an intelligent terminal, wherein the input device is in communication connection with the intelligent terminal and transmits a received input operation to the intelligent terminal, the input operation is displayed on a screen of the intelligent terminal, and the input device includes at least one operating portion; one end of the input device is recessed inwardly to form a recess, and the recess accommodates a top portion or a bottom portion of the intelligent terminal; when the input device is connected with the intelligent terminal, the top
(Continued)

portion or the bottom portion of the intelligent terminal is inserted into the recess, the operating portion and the screen of the intelligent terminal are arranged on a same side, and a display interface of the screen of the intelligent terminal is exposed in a projection range of the operating portion. After the technical solution above is implemented, a single-sided installation mode is adopted to support a user to simultaneously perform interactive operations on the input device and the touch screen; the screen is not sheltered, so that the user can conveniently observe all displayed contents; and the input device is convenient for the user to hold and carry.

8 Claims, 3 Drawing Sheets

(51) Int. Cl.
G06F 3/02 (2006.01)
G06F 3/0338 (2013.01)
A63F 13/2145 (2014.01)
A63F 13/235 (2014.01)

(52) U.S. Cl.
CPC ........ *G06F 3/0362* (2013.01); *A63F 13/2145* (2014.09); *A63F 13/235* (2014.09); *A63F 2300/1031* (2013.01); *A63F 2300/1043* (2013.01); *A63F 2300/1075* (2013.01)

(58) Field of Classification Search
CPC .. A63F 2300/1075; G06F 3/02; G06F 3/0338; G06F 3/0362; H04M 1/02; H04M 1/725
See application file for complete search history.

(56) References Cited

U.S. PATENT DOCUMENTS

| 2013/0109476 | A1* | 5/2013 | Baum | A63F 13/235 463/37 |
| 2014/0247246 | A1* | 9/2014 | Maus | G06F 3/0443 345/174 |
| 2018/0065035 | A1* | 3/2018 | Yamazaki | A63F 13/211 |
| 2020/0310556 | A1* | 10/2020 | Duan | A63F 13/24 |

FOREIGN PATENT DOCUMENTS

| CN | 107911511 A | 4/2018 |
| CN | 207612285 U | 7/2018 |
| WO | WO 2010/113487 A1 | 10/2010 |

* cited by examiner

INPUT DEVICE FOR INTELLIGENT TERMINAL

CROSS-REFERENCE TO RELATED APPLICATION

The present disclosure is the U.S. National Stage of International Application No. PCT/CN2018/111752, filed on Oct. 24, 2018, which claims priority of Chinese Patent Application No. 201721592060.2, filed on Nov. 24, 2017, which is incorporated herein by reference in its entirety.

TECHNICAL FIELD

The present disclosure relates to the field of input devices, and more particularly, to an input device for an intelligent terminal.

BACKGROUND ART

With the progress of science and technology and economic development, an intelligent terminal with a screen such as a smartphone, a tablet computer and the like is becoming more and more popular, and people can perform an interactive operation with the intelligent terminal through a touch screen or a key on the intelligent terminal. However, when a more complicated interactive operation is performed, such as playing a game, it is difficult to meet requirements of the interactive operation by depending on an input device of the intelligent terminal itself only, which is namely the touch screen and limited keys, and there are problems of insufficient hand-held comfort level, screen sheltering by a thumb during operation of the touch screen and deviation easily occurring on a game control accuracy, thus affecting user's operation experience.

A method of adding an external input device is adopted for the problems above in the prior art, such as a gamepad, and FIGS. 1, 2 and 3 show three existing external input devices respectively. In FIG. 1, the intelligent terminal is embedded into the input device, which means that the intelligent terminal and the input device are integrated into a whole, both ends of the intelligent terminal are provided with operating units of the input device, and a user operates the intelligent terminal through a direction key and a function key on the input device. In FIG. 2, the intelligent terminal is separately connected with the external input device, the intelligent terminal only realizes a function of one display screen, and all operations are completed on the external input device. FIG. 3 shows a rocker device for separately replacing the direction key, and the rocker device is directly attached to the screen to replace a virtual rocker displayed through the touch screen and turn the virtual rocker key into a real rocker. The three input devices above have the following problems:

1. the screen can be sheltered during operation, which affects determination of a displayed content, for example, the rocker device in FIG. 3 can shelter the screen;

2. the device is uncomfortable to hold, and it is uncomfortable to hold the device by hands for a long time, for example, a holding size of an original intelligent terminal is increased in FIG. 1; and 3. the interactive operation is inaccurate, and an operation skill cannot be fully reflected, for example, an auxiliary operation of the touch screen cannot be performed in FIG. 2.

SUMMARY OF THE DISCLOSURE

In order to overcome the defects above, the present disclosure provides an input device which does not shelter a touch screen to support a user to simultaneously operate the input device and the touch screen.

The present disclosure discloses an input device for an intelligent terminal, the input device is in communication connection with the intelligent terminal and transmits a received input operation to the intelligent terminal, and the input operation is displayed on a screen of the intelligent terminal, wherein the input device includes at least one operating portion; one end of the input device is recessed inwardly to form a recess, and the recess accommodates a top portion or a bottom portion of the intelligent terminal; when the input device is connected with the intelligent terminal, the top portion or the bottom portion of the intelligent terminal is inserted into the recess, the operating portion and the screen of the intelligent terminal are arranged on a same side, and a display interface of the screen of the intelligent terminal is exposed in a projection range of the operating portion.

Preferably, a side wall of the recess corresponding to the screen of the intelligent terminal is provided with a notch, and a shape of the notch is adapted to an edge shape of the screen of the intelligent terminal; and when the input device is connected with the intelligent terminal, the screen is exposed through the notch.

Preferably, the shape of the notch is a rectangle corresponding to the edge shape of the screen.

Preferably, the input device is a cuboid.

Preferably, a side surface of the cuboid is provided with a rounded corner.

Preferably, the operating portion includes one or more of a rocker, a button or a rotary knob.

Preferably, the operating portion includes a direction control key formed by a potentiometer.

Preferably, the side wall of the recess is provided with at least one hole; and when the input device is connected with the intelligent terminal, a camera and a microphone of the intelligent terminal are exposed through the hole above.

Preferably, the input device includes at least two operating portions, and all the operating portions are arranged on a same side surface of the input device.

Preferably, the input device and the intelligent terminal are provided connecting mechanisms matched with each other, and the input device and the intelligent terminal are fixed through the connecting mechanisms; and the connecting mechanism includes any one or any combination of a guide groove, a buckle, a screw, a magnet and a bolt.

The present disclosure has the following effects after adopting the technical solution above:

1. single-sided installation is adopted to support a user to simultaneously perform interactive operations on the input device and the touch screen;

2. the screen is not sheltered, which is convenient for the user to observe all displayed contents; and 3. the present disclosure is convenient for the user to hold and carry.

Figure 1:
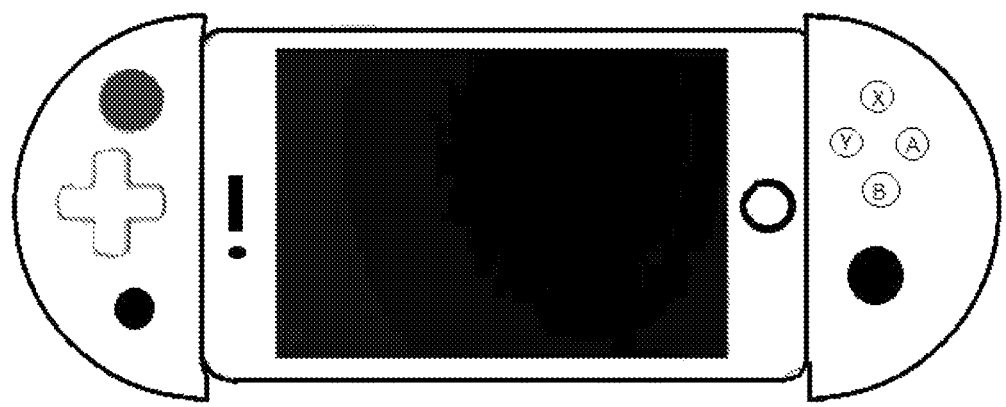
FIG. 1 illustrates an input device in the prior art.
Figure 2:
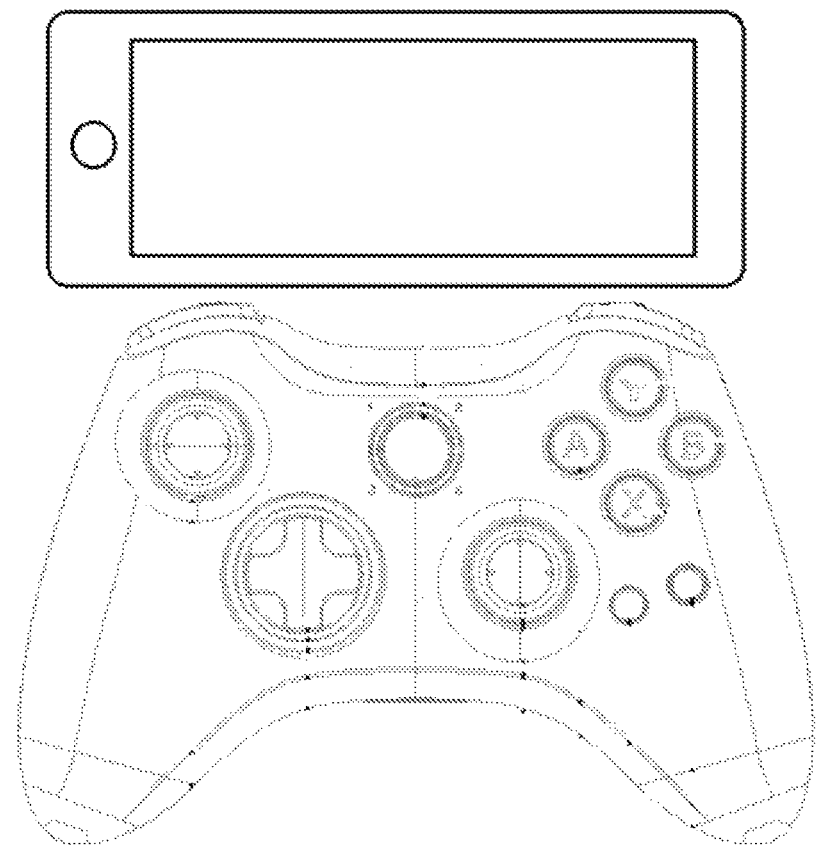
FIG. 2 illustrates another input device in the prior art.
Figure 3:
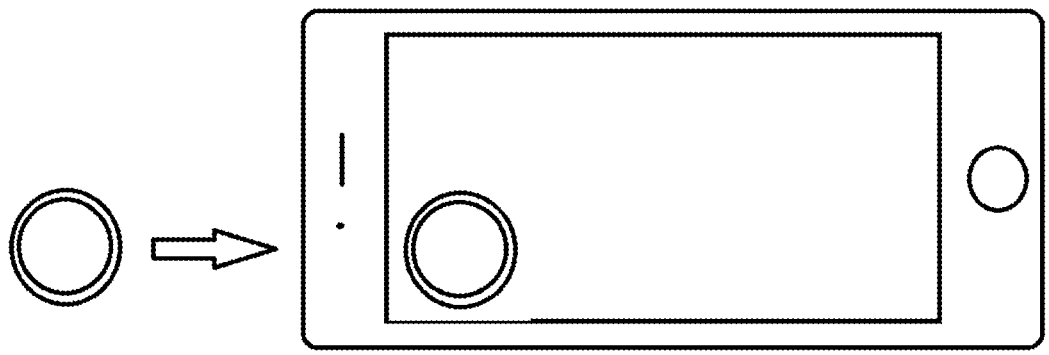
FIG. 3 illustrates another input device in the prior art.

REFERENCE NUMERALS 1 refers to intelligent terminal, 2 refers to input device, 3 refers to operating portion, 4 refers to recess, 5 refers to notch and 6 refers to screen.

DETAILED DESCRIPTION OF THE PREFERRED EMBODIMENTS

The advantages of the present disclosure are further described hereinafter with reference to the drawings and the specific embodiments.

The exemplary embodiments are described in detail herein, and are illustratively shown in the drawings. When the following description refers to the drawings, unless otherwise indicated, the same numbers in different drawings indicate the same or similar elements. The embodiments described in the following exemplary embodiments do not represent all embodiments consistent with the present disclosure. On the contrary, they are merely examples of devices and methods consistent with some aspects of the present disclosure described in detail in the appended claims.

The terms used in the present disclosure are for the purpose of describing particular embodiments only and are not intended to limit the present disclosure. The singular forms of "a", "said" and "the" used in the present disclosure and the appended claims are also intended to include the plural forms, unless other meanings are clearly indicated by the context. It should also be understood that the term "and/or" used herein refers to and includes any or all possible combinations of one or more associated listed items.

It shall be understood that although the terms first, second, third, etc. may be used to describe various information in the present disclosure, the information should not be limited to these terms. These terms are only used to distinguish the information of the same type from each other. For example, the first information can also be referred to as the second information, and similarly, the second information can also be referred to as the first information without departing from the scope of the present disclosure. Depending on the context, the word "if" used herein can be explained as "in the case of", "when" or "in response to determine".

In the description of the present disclosure, it should be understood that the orientation or position relation indicated by the terms "longitudinal", "lateral", "upper", "lower", "front", "rear", "left", "right", "vertical", "horizontal", "top", "bottom", "inside", "outside" and the like is based on the orientation or position relation shown in the drawings, which is only used for convenience of description of the present disclosure and simplification of description instead of indicating or implying that the indicated device or element must have a specific orientation, and be constructed and operated in a specific orientation, and thus should not be understood as a limitation to the present disclosure.

In the description of the present disclosure, the terms "installation", "connected" and "connection" should be understood in broad sense unless otherwise specified and defined. For example, they can be mechanical connection or electrical connection, can also be connected inside two components, can be directly connected, and can also be indirectly connected through an intermediate medium. The specific meanings of the above terms can be understood in a specific case by those of ordinary skills in the art.

In the following description, the postfixes such as "module", "component" or "unit" used to indicate elements are only used to facilitate the description of the present disclosure and have no specific meanings in themselves. Therefore, the "module" and "component" can be used in a mixed way.

Figure 4:
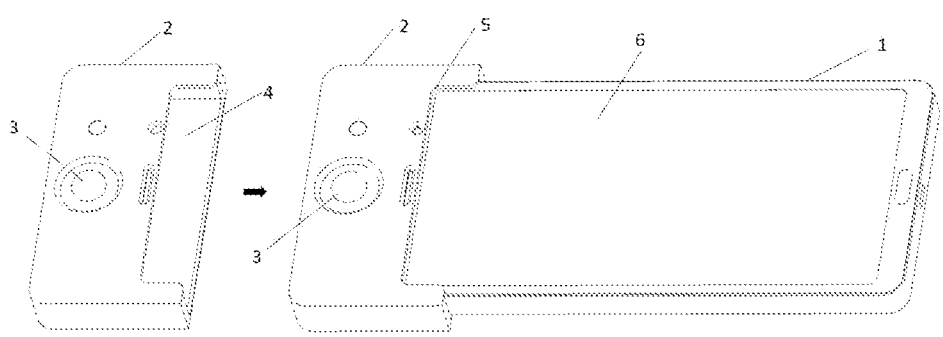
FIG. 4 is a structure diagram complying with an input device for an intelligent terminal according to a preferred embodiment of the present disclosure.
Figure 5:
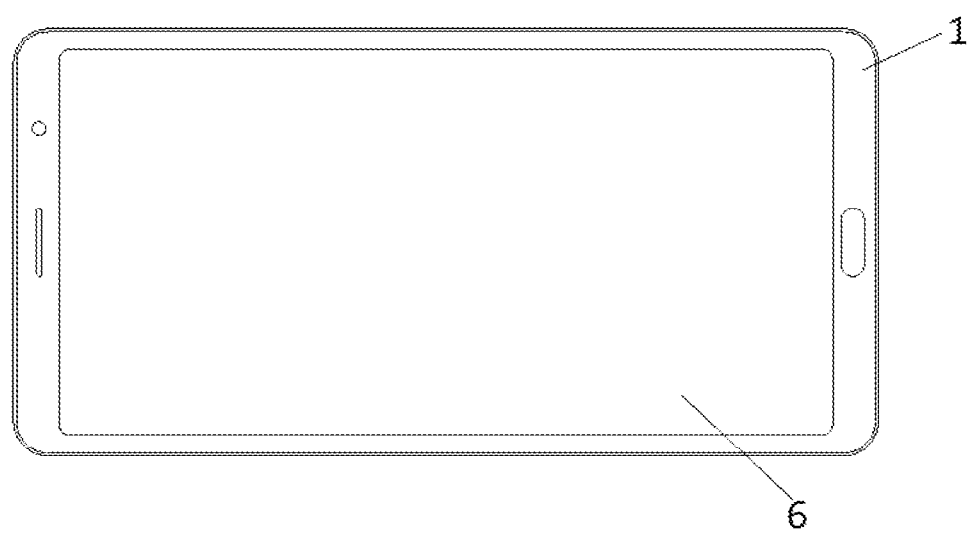
FIG. 5 is a structure diagram complying with the intelligent terminal according to a preferred embodiment of the present disclosure.

With reference to FIG. 4 which is a structure diagram complying with an input device 2 for an intelligent terminal 1 according to a preferred embodiment of the present disclosure, the input device 2 is in communication connection with the intelligent terminal 1 and transmits a received input operation to the intelligent terminal 1, and the input operation is displayed on a screen 6 of the intelligent terminal 1. The intelligent terminal 1 may be connected with the input device 2 by Bluetooth, and Bluetooth pairing is required during connection.

The input device 2 includes:

an operating portion 3.

The operating portion 3 is a component for receiving a user operation and may be one or more of a rocker, a button or a rotary knob. The input device 2 may be provided with only one operating portion 3 or a plurality of operating portions 3. The operating portions 3 are arranged on a same side surface of the input device 2 for convenience of concentrated distribution and the user operation.

One end of the input device 2 is recessed inwardly to form a recess 4, and the recess 4 accommodates a top portion or a bottom portion of the intelligent terminal 1. When the input device 2 is connected with the intelligent terminal 1, the top portion of the intelligent terminal 1 is inserted into the recess 4, the operating portion 3 and the screen 6 of the intelligent terminal 1 are arranged on a same side, and a display interface of the screen 6 of the intelligent terminal 1 is exposed in a projection range of the operating portion 3, which means that the operating portion 3 does not shelter the screen 6, and a user can see the whole display interface of the screen 6 during operation. In FIG. 4, a shape of the intelligent terminal 1 is a flat and long cuboid, so that the recess 4 is designed as a flat and long cuboid space with a corresponding size, and a cross-sectional area of an inlet of the recess 4 is equal to an area of an end surface of the top portion or the bottom portion of the intelligent terminal 1. The intelligent terminal 1 may have different external sizes according to different manufacturers and models, and the recess 4 is designed to have an external size matched with the top portion of the intelligent terminal 1. A depth of the recess 4 shall be designed to ensure that when the input device 2 is connected with the intelligent terminal 1, the input device 2 is firmly connected and can load a weight of the input device 2.

When the input device 2 is connected with the intelligent terminal 1, the side surface where the operating portion 3 is located shall be kept on a same side as the screen 6, so that the user can see the operating portion 3 while observing the screen, which is convenient for operation. Meanwhile, design of the recess 4 shall ensure that the screen 6 is not sheltered, so as not to affect viewing of the user, for example, the depth of the recess 4 shall ensure that a side wall of the recess 4 does not shelter the screen 6, which means that the depth of the recess 4 is less than or equal to a distance from the screen 6 to a top end edge or a bottom end edge of the intelligent terminal 1. The screen 6 may also be a touch screen, when the user uses the input device 2 for an interactive operation, the intelligent terminal 1 is placed horizontally, and one hand operates the input device 2, while the other hand operates the touch screen to simultaneously perform various input operations. Since the input device 2 is connected with only one end of the intelligent terminal 1 in the embodiment, compared with the prior art, an overall size of the intelligent terminal 1 during the user operation is reduced, which is convenient for the user to hold.

As a further improvement to the input device 2, a side wall of the recess 4 corresponding to the screen 6 of the intelligent terminal 1 is provided with a notch 5; a shape of the notch 5 is adapted to an edge shape of the screen 6 of the intelligent terminal 1; and when the input device 2 is connected with the intelligent terminal 1, the screen is exposed through the notch 5. Narrow-edge design is usually adopted in the mainstream intelligent terminal 1, the distance from the screen 6 to the top end edge of the intelligent terminal 1 is short, and in order to keep the recess 4 deep enough to meet requirement of firm connection, which is to ensure a mechanical property, without sheltering the screen 6, the side wall of the recess 4 corresponding to the screen 6 is provided with the notch 5, so as to expose the screen 6. Meanwhile, three side walls of the recess 4 corresponding to a back surface (a side surface opposite to the screen 6) and a narrow side surface of the intelligent terminal 1 keep a sufficient extension length to provide more contact areas and enhance the mechanical property. The operating portion 3 is arranged on the same side surface as the notch 5 to be located on the same side as the screen 6. The shape of the notch 5 is adapted to the edge shape of the screen 6, and the mainstream screen 6 is usually designed as a rectangle, so that the notch 5 is also designed as a rectangle adapted to a size of the screen 6.

As a further improvement to the input device 2, the input device 2 is a cuboid, a side surface of the cuboid is provided with the operating portion 3, and a side surface perpendicular to the side surface provided with the operating portion 3 is provided with an opening of the recess 4. Since the intelligent terminal 1, especially a smartphone, is often designed as a cuboid, the input device is also designed as a cuboid to keep an overall visual effect consistent. In order to provide the user with better hand feeling, the side surface of the cuboid is provided with a rounded corner, so that the user feels comfortable when holding the input device 2. Relative to handle shape design in the prior art, the rectangular shape of the input device 2 can be matched with the external size of the intelligent terminal 1, and has a characteristic of miniaturization, which is convenient for the user to hold.

As a further improvement to the input device 2, the input device 2 may be provided with different types of operating portions 3, such as a combination of the rocker and the button, or a combination of the rotary knob and the button; and only one of the operating portions 3 can be arranged. The operating portion 3 may include a direction control key formed by a potentiometer, the direction control key is convenient for the user to operate in multiple directions and is a mainstream device in current external operation devices.

As a further improvement to the input device 2, the side wall of the recess 4 is provided with at least one hole; and when the input device 2 is connected with the intelligent terminal 1, a camera and a microphone of the intelligent terminal 1 are exposed through the hole above. According to different positions of components of the intelligent terminal 1 to be exposed, an opening position of the hole is also different, for example, a main camera of the intelligent terminal 1 is usually arranged on a back surface of the intelligent terminal 1, so that the hole needs to be opened in the side wall of the recess 4 corresponding to the back surface of the intelligent terminal 1, and a position of the hole is corresponding to a position of the main camera. Similarly, one side of the screen of the intelligent terminal 1 may also have a front camera or a microphone, or a receiver, which also needs to be exposed through the hole to ensure that a function of the component above is not affected.

As a further improvement to the input device 2, the input device 2 and the intelligent terminal 1 are provided connecting mechanisms matched with each other, and the input device 2 and the intelligent terminal 1 are fixed through the connecting mechanisms; and the connecting mechanism includes any one or any combination of a guide groove, a buckle, a screw, a magnet and a bolt. Based on a connection mode of the recess 4, the connecting mechanisms matched with each other are further additionally arranged on the input device 2 and the intelligent terminal 1 in the improved embodiment to connect and fix the input device 2 and the intelligent terminal 1, and prevent the intelligent terminal 1 from slipping out of the recess 4. The connecting mechanism includes at least a first portion and a second portion matched with each other, the first portion and the second portion are respectively arranged on the input device 2 and the intelligent terminal 1, and when the intelligent terminal 1 is inserted into the recess 4, the first portion and the second portion of the connecting mechanism are matched with each other for fixation, so that the intelligent terminal 1 and the input device 2 are firmly fixed. The connecting mechanism may be a guide groove, a buckle, a screw, a magnet, a bolt and other specific implementation structures, and any one of the structures may be selectively used for connection, or a combination of two or more of the structures may be selectively used as the connecting mechanism. When the connecting mechanism is the guide groove, one of the intelligent terminal 1 or the input device 2 is provided with the guide groove, and the other is provided with a bulge matched with the guide groove. When the connecting mechanism is the buckle, one of the intelligent terminal 1 or the input device 2 is provided with the buckle, and the other is provided with a clamping portion matched with the buckle. When the connecting mechanism is the screw, one of the intelligent terminal 1 or the input device 2 is provided with a screw hole matched with the screw, and the other is provided with a screw fixing position allowing the screw to pass through. When the connecting mechanism is the magnet, one of the intelligent terminal 1 or the input device 2 is provided with the magnet, and the other is provided with a ferromagnetic metal or a magnet. When the connecting mechanism is the bolt, one of the intelligent terminal 1 or the input device 2 is provided with a bolt hole matched with the bolt, and the other is provided with a bolt fixing position allowing the bolt to pass through.

The screen 6 may be the touch screen, when the user uses the screen, the intelligent terminal 1 is placed horizontally, and one hand can operate the input device 2 while the other hand can operate the touch screen.

It should be noted that the embodiments of the present disclosure have a better implementation performance and are not intended to limit the present disclosure in any form. Those skilled in the art may change or decorate the technical contents disclosed above into equivalent effective embodiments. Any modification or equivalent change and decoration to the embodiments above according to the technical essence of the present disclosure without departing from the contents of the technical solutions of the present disclosure should still fall within the scope of the technical solutions of the present disclosure.

The invention claimed is:

1. An input device for an intelligent terminal, the input device capable of being in a communication connection with the intelligent terminal and transmitting a received input operation to the intelligent terminal, and the received input operation capable of being displayed on a screen of the intelligent terminal, wherein:

the input device comprises at least one operating portion provided on a top wall of the input device;

the input device comprises the top wall, a back wall opposite to the top wall, and four side walls, wherein one of the four side wall comprises an opening configured to receive a top portion or a bottom portion of the intelligent terminal, one end of the top wall of the input device is recessed inwardly to form a recess while the back wall maintains a full size, the recess is configured to accommodate and contain the top portion or the bottom portion of the intelligent terminal, and the input device is cuboid-shaped; and when the input device is connected with the intelligent terminal, the top portion or the bottom portion of the intelligent terminal is inserted into the recess, the operating portion and the screen of the intelligent terminal are arranged on a same side, and the at least one operating portion is positioned such that an entire display area of the screen is exposed to a user.

2. The input device according to claim 1, wherein:

a top edge of the recess corresponding to the screen of the intelligent terminal is provided with a notch, and a shape of the notch is adapted to an edge shape of the screen of the intelligent terminal; and when the input device is connected with the intelligent terminal, the screen is exposed through the notch.

3. The input device according to claim 2, wherein: the shape of the notch is a rectangle corresponding to the edge shape of the screen.

4. The input device according to claim 1, wherein: a side surface of the cuboid is provided with a rounded corner.

5. The input device according to claim 1, wherein: the at least one operating portion comprises at least one of a rocker, a button or a rotary knob.

6. The input device according to claim 1, wherein: the at least one operating portion comprises a direction control key formed by a potentiometer.

7. The input device according to claim 1, wherein the top wall of the input device comprises at least one hole formed adjacent to a top edge of the recess.

8. The input device according to claim 1, wherein:

the input device and the intelligent terminal comprise connecting mechanisms that match with each other and are provided on the input device and the intelligent terminal, respectively, and the input device and the intelligent terminal are fixed through the connecting mechanisms; and the connecting mechanisms comprise at least one of a guide groove, a buckle, a screw, a magnet or a bolt.

* * * * *